United States Patent [19]

Pryor

[11] Patent Number: 4,555,096
[45] Date of Patent: Nov. 26, 1985

[54] PNEUMATIC SPRING AND STRUT ASSEMBLY

[75] Inventor: Marc I. Pryor, Dearborn, Mich.

[73] Assignee: Ford Motor Company, Dearborn, Mich.

[21] Appl. No.: 553,412

[22] Filed: Nov. 18, 1983

Related U.S. Application Data

[63] Continuation of Ser. No. 208,765, Nov. 20, 1980, abandoned.

[51] Int. Cl.⁴ ................................................. F16F 9/04
[52] U.S. Cl. .................................... 267/8 R; 267/64.21
[58] Field of Search ...................... 188/321.11, 322.16, 188/322.17; 267/64.21, 8 R, 64.23, 64.24, 64.27, 35, 63 R, 118, 122; 280/668, 710

[56] References Cited

U.S. PATENT DOCUMENTS

| | | | |
|---|---|---|---|
| 2,018,653 | 10/1935 | Best | 280/663 |
| 2,660,449 | 11/1953 | MacPherson | 280/665 |
| 2,856,198 | 10/1958 | Muller | 280/674 |
| 3,046,000 | 7/1962 | Polhemus et al. | 267/35 |
| 3,061,329 | 10/1962 | Hintzen | 280/672 |
| 3,331,616 | 7/1967 | Jackson | 280/708 |
| 3,333,653 | 8/1967 | Eirhart, Jr. | 180/73 |
| 3,482,829 | 12/1969 | Kidby | 267/35 |
| 3,497,198 | 2/1970 | Miller | 267/35 |
| 3,525,512 | 8/1970 | Hagwood | 267/64.16 |
| 3,527,451 | 9/1970 | Long, Jr. | 267/64.21 |
| 3,573,880 | 4/1971 | Sakai | 267/60 |
| 3,628,810 | 12/1971 | Graef | 267/34 |
| 3,647,239 | 3/1972 | Katsumori | 280/708 |
| 3,700,225 | 10/1972 | Fader et al. | 267/64.24 |
| 3,893,702 | 7/1975 | Keijzer et al. | 280/701 |
| 3,954,255 | 5/1976 | Keijzer et al. | 267/64.21 |
| 3,954,257 | 5/1976 | Keijzer et al. | 267/64.21 |
| 4,067,558 | 1/1978 | Keijzer et al. | 267/8 R |
| 4,105,222 | 8/1978 | Buchwald | 280/668 |
| 4,200,270 | 4/1980 | Merkle | 267/64.24 |
| 4,206,907 | 6/1980 | Harrod | 267/64.24 |
| 4,306,638 | 12/1981 | Malott | 188/322.16 |

FOREIGN PATENT DOCUMENTS 1352342  1/1964  France .................... 267/63 R Primary Examiner—Bruce H. Stoner, Jr.
Assistant Examiner—Richard R. Diefendorf
Attorney, Agent, or Firm—Jerome R. Drouillard; Roger L. May

[57] ABSTRACT

A suspension strut for a motor vehicle which has a pneumatic spring assembly 28 mounted about a strut assembly 10. The pneumatic spring assembly has a flexible diaphragm 30 secured to a tubular sleeve 48 which is coaxially mounted about the strut body 18. The sleeve 48 is rotatably mounted to the strut body 18 by a bearing 54 and a bushing 67 to minimize torsional stress of the flexible diaphragm 30 when steering of the wheel rotates the strut body 18 with respect to the vehicle body.

6 Claims, 3 Drawing Figures

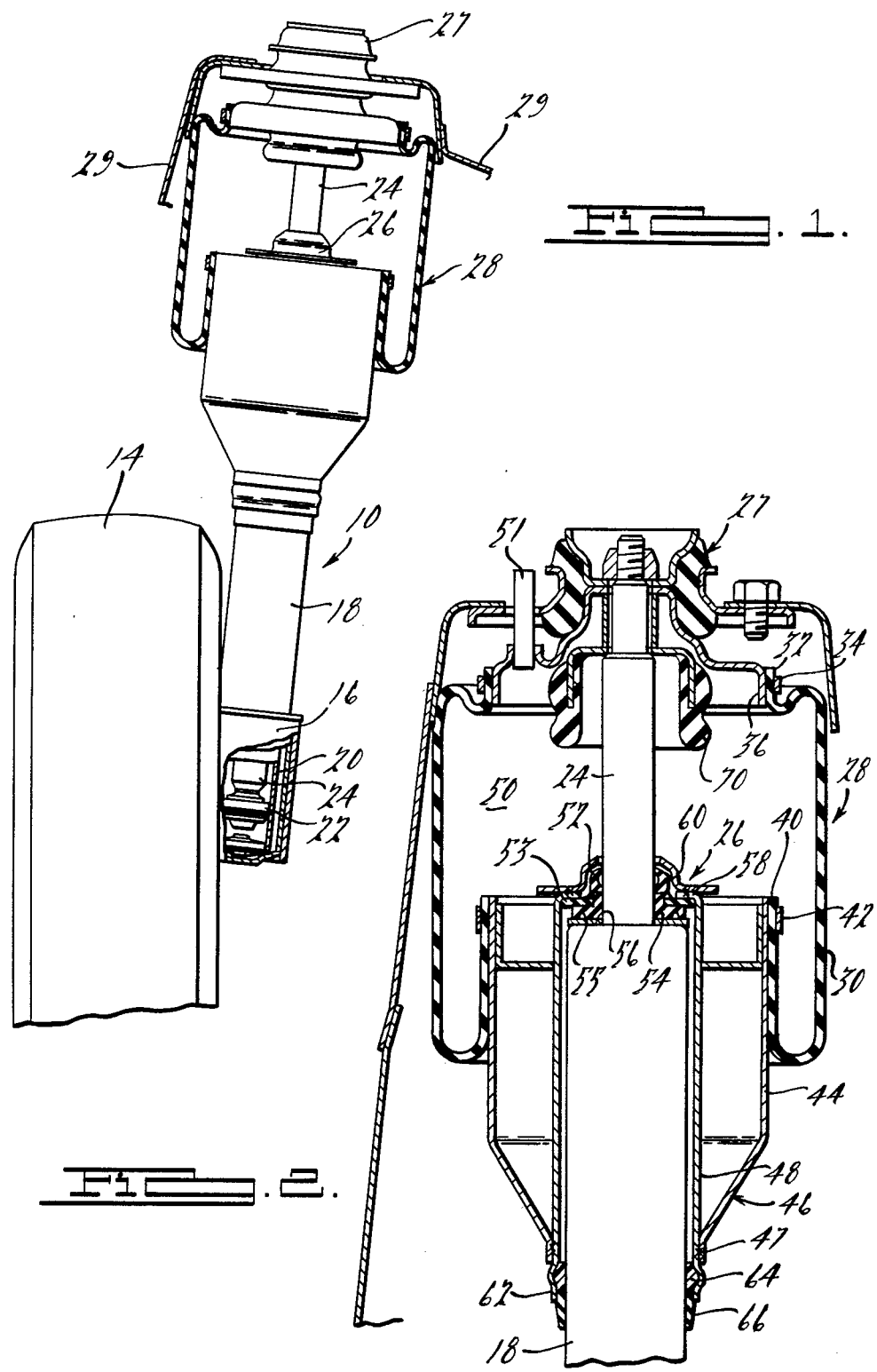

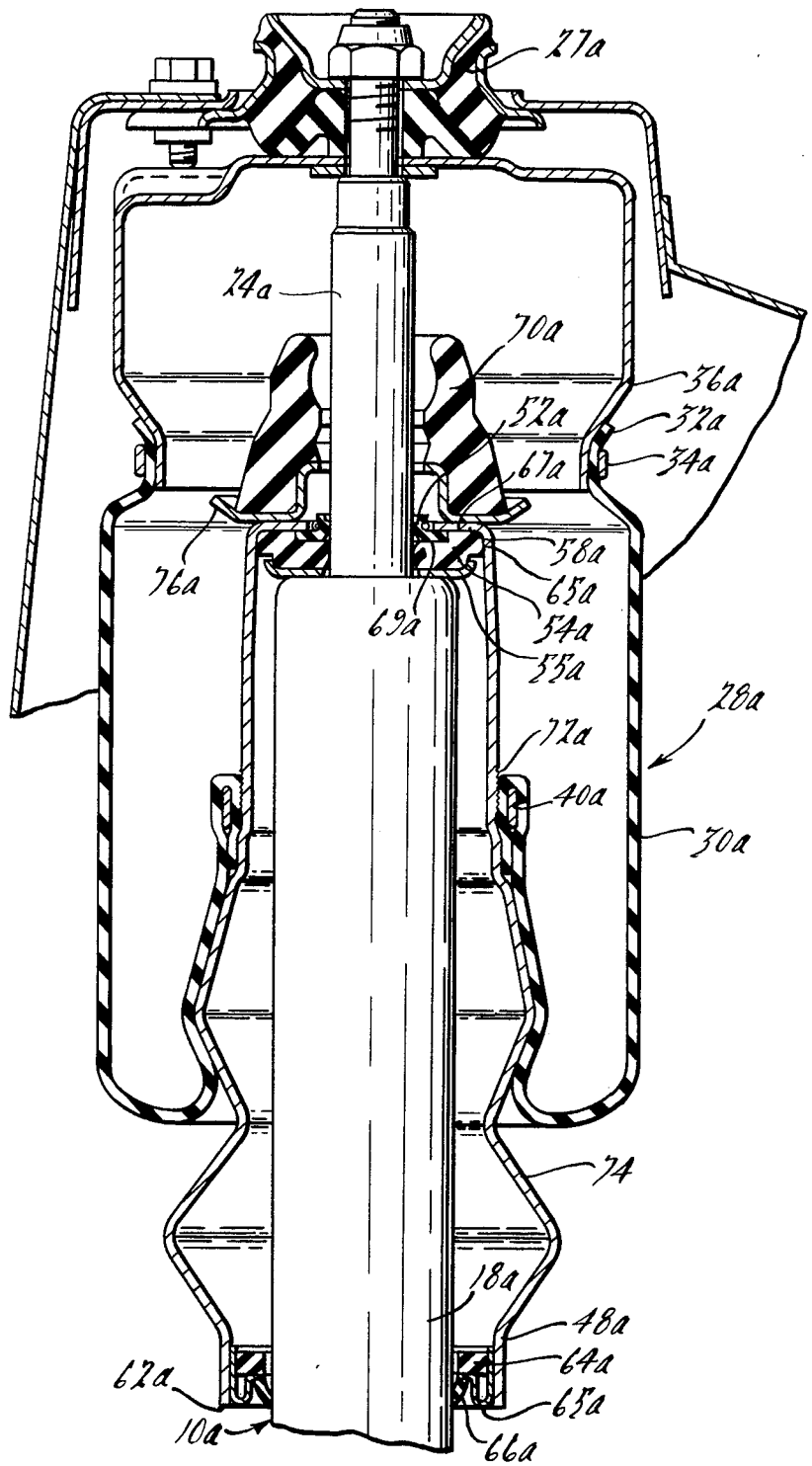

PNEUMATIC SPRING AND STRUT ASSEMBLY

This application is a continuation of Ser. No. 208,765 filed Nov. 20, 1980, now abandoned.

BACKGROUND OF THE INVENTION

1. Field of the Invention

This invention relates to a suspension strut, or more particularly, to a suspension strut incorporating a pneumatic spring.

2. Disclosure Information

Suspension struts such as used in MacPherson type suspensions are commonly constructed with either coil springs or air springs mounted coaxially about the strut. A particular problem is encountered by front suspension struts which are mounted to the front steerable wheels. When the wheels are steered, the spring undergoes a twisting movement as the strut body turns with the wheel. The twisting undesirably changes the characteristics of the coil spring. To solve the torsional twist of coil springs, a bearing assembly is placed between the vehicle body and a mounted piston rod of the strut to allow the strut to rotate relative to the body. In this fashion, the twisting of the spring is avoided. U.S. Pat. No. 2,660,449 issued to MacPherson on Nov. 24, 1953 discloses such a bearing assembly.

Furthermore, U.S. Pat. No. 3,573,880 issued to Sakai on Apr. 6, 1971 discloses a coil spring rotatably mounted with respect to a strut housing by means of a ball joint introduced between a lower spring seat and the housing.

Air springs also are mounted about suspension struts alone or in combination with coil springs. U.S. Pat. No. 3,954,257 issued to Keijzer et al on May 4, 1976 discloses a strut having an air leveler in conjunction with a coil spring rotatably mounted through a bearing assembly to the vehicle body.

It is desirous when incorporating an air suspension spring on a MacPherson strut assembly to allow for replacement of the MacPherson strut without removal or disassembly of the air spring assembly. In order to do this, the air spring should be detachable with respect to the strut body. In doing so, it is desirous to place a bearing between the air spring assembly and the strut body.

SUMMARY OF THE INVENTION

In accordance with the invention, a suspension strut assembly includes a pneumatic spring assembly mounted about the suspension strut and rotatable with respect to the strut housing.

In one embodiment, the pneumatic spring is clamped onto a tubular sleeve mounted about the strut housing. A lateral thrust bushing is positioned between the housing and the sleeve. A load bearing is positioned about a piston rod extending from the strut housing for rotatably mounting the sleeve to the strut housing when normal axial and side loads are exerted on the strut housing and the sleeve. The pneumatic spring is also secured to the strut mounting assembly.

In this fashion, the pneumatic spring assembly remains stationary while the strut can undergo rotatable movement and secondly, the strut may be removed for replacement from the suspension assembly without disturbing the pneumatic spring structure.

BRIEF DESCRIPTION OF THE DRAWINGS

Reference now is made to the accompanying drawings in which:

FIG. 1 is a front elevational view and partially segmented view of a suspension strut assembly illustrating one embodiment of the invention;

FIG. 2 is an enlarged front elevation and partially segmented view of the pneumatic spring attachment of the suspension strut shown in FIG. 1;

FIG. 3 is a fragmentary front elevational and partially segmented view of a second embodiment of the invention.

DETAILED DESCRIPTION OF THE PREFERRED EMBODIMENTS

Referring to FIG. 1, a suspension strut assembly 10 has a bottom end connected to a vehicle wheel 14 through a conventional bracket and spindle assembly 16. The suspension strut assembly 10 includes a strut body 18 and most commonly a working cylinder 20 therein which has a piston 22 attached to a piston rod 24 which extends up through the upper end 26 of strut body 18 and attached to mounting assembly 27 which connects the suspension to the sprung portion 29 of a motor vehicle.

A pneumatic spring assembly 28 is mounted about the strut assembly 10 to support sprung portion 29. As more clearly shown in FIG. 2, the pneumatic spring assembly 28 includes a flexible diaphragm 30 which has an upper annular edge 32 clamped onto a flange 36 of mounting assembly 27 by a clamp 34. The flexible diaphragm 30 has a bottom edge 40 clamped onto an axially extending wall 44 integral with a radially extending flange 46 by clamp 42. The flange 46 is welded at 47 onto a tubular sleeve 48 to prevent air leakage therethrough. As shown in FIG. 2, axially extending wall 44, radially extending flange 46, and tubular sleeve 48 comprise a diaphragm seat assembly to which bottom edge 40 of flexible diaphragm 30 is clamped. An annular double lip seal 52 bonded to a washer 53 is mounted about the piston rod to seal the piston rod 24 with respect to the tubular sleeve 48 to prevent air from leaking therethrough. The sleeve 48, piston rod 24, seal 52, washer 53, flange 46, flexible diaphragm 30 and flange 36 form a variable volume chamber 50. The variable volume chamber 50 is connected to an air supply through a nozzle 51 passing through flange 36.

On the exterior side of the washer 53, is a thrust bearing 54 which allows rotational movement between the tubular sleeve 48 and the strut body 18 when normal vertical and lateral loads are exerted on the strut. The thrust bearing 54 is annular in shape and mounted about the piston rod 24 at the end 56 of body 18. The thrust bearing 54 has an L-shaped cross-section to accomodate lateral as well as vertical loads. The bearing 54 is made from a low friction material, for example, Teflon, impregnated fiber, or a phenolic plastic. A plastic thrust washer 55 is positioned about rod 24 between bearing 54 and strut end 56.

The tubular sleeve 48 has an annular inwardly bent end 58 which sits on the upper surface of the washer 53 which in turn rests on thrust bearing 54. The upper surface of end 58 is welded onto a jounce bumper contact flange 60.

The tubular sleeve 48 extends down over the body 18. Near the proximity of lower end 62 of sleeve 48, a bushing 64 is positioned between the sleeve 48 and body 18 such that the body 18 is rotatable with respect to the sleeve 48. The bushing 64 is made from a low friction material like that of the upper load bearing 54. An elastomeric lip seal 66 is positioned below the bushing 64 to prevent dirt and grime from entering into the bushing area.

The mounting assembly 27 has a jounce bumper 70 attached thereto which can engage the flange 60.

In operation, air is introduced into the pneumatic air spring assembly 28 through the nozzle 51. The diaphragm 30 rolls upward off of the axial extending wall 44 to increase the volume of chamber 50 until the desired height is reached at which time the air flow through nozzle 51 is shut off. As the vehicle is driven, the bumps encountered by wheel 14 move the strut body 18 upward and downward with respect to piston rod 24 at which time the diaphragm 30 flexes onto and off of the wall 44 as the diaphragm 30 and chamber 50 function as an air spring. When the wheel 14 is steered or turned, the strut body 18 which follows the wheel, is allowed to rotate with respect to the piston rod 24 and the pneumatic spring assembly 28 due to bearing 54 and bushing 64.

The advantages of the strut assembly 10 and pneumatic air spring assembly 28 are multiple. Firstly, since the strut body 18 rotates relative to the pneumatic spring assembly 28, the diaphragm 30 incurs no torsional stress. The elimination of unwanted twisting provides for a more controlled spring rate and a more durable air spring.

Secondly, the tubular sleeve 48 provides for easy removal of the strut assembly 10 from the pneumatic spring assembly 28. The strut assembly 10 slides out through the open bottom end 62 of the sleeve 48 after the piston rod is disengaged from the upper mount assembly 38. The removal or replacement of the strut assembly does not affect the structure of the pneumatic spring assembly 28. In other words, the pneumatic spring assembly 28 does not have to be removed or dismantled in order to replace the strut.

Thirdly, the thrust bearing 54 and bushing 64 eliminate the necessity of a bearing assembly in the mounting assembly 27. Consequently, the cost of the mounting assembly 27 is reduced while retaining the twist free properties of the pneumatic spring assembly.

Referring now to FIG. 3, a second embodiment is disclosed which includes a strut assembly 10a downwardly extending from mounting assembly 27a and rotatably mounted with respect to sleeve 48a. Bushing 64a which is incorporated in a pneumatic spring assembly 28a, is mounted at the bottom end 62a of sleeve 48a between the sleeve 48a and the strut body 18a. The bushing 64a and a lip seal 66a are positioned by an annular seating ring 65a, fitted within the bottom end 62a of sleeve 48a.

Thrust washer 55a and bearing 54a are mounted at the top end 56 of strut body 18. The bearing 54a has an outer surface 65a abutting the sleeve 48a and an upper surface 67a abutting the upper bent end 58a of sleeve 48a. A center recessed area 69a in bearing 54a receives an annular seal 52a for sealing the piston rod 24a against air leakage.

The end 32a of diaphragm 30a is clamped onto a cup-shaped flange 36a of the mounting assembly 27a by clamp 34a. A jounce bumper 70a is bonded to a flange plate 76a which is welded to the sleeve 48a. The jounce bumper 70a engages the flange 36a upon sufficient compression of the strut assembly 10.

A clamp 40a clamps the bottom end of the flexible diaphragm 30a onto a serrated portion 72a of the sleeve 48a which functions as a diaphragm seat assembly. The flexible diaphragm 30a rolls upon a convoluted section 74 below the serrated piston 72a of the sleeve. The convoluted section 74 provides for varied spring rates at different levels of deflection of the vehicle body with respect to the wheels. The convoluted section 74 can be custom shaped for an individual model or for specifically desired spring rates.

The function of the pneumatic spring assembly 28a is essentially the same as the first embodiment. The tubular sleeve 48a and the flexible diaphragm 30a are rotatable with respect to the strut body 18a to minimize harmful torsional stresses of the flexible diaphragm 30a. The rotation is accomplished by the introduction of bushing 64a and bearing 54a.

In this fashion, an economical and durable spring is constructed which can be incorporated into a pneumatic strut assembly and provide for easy removal of the strut assembly.

Variations and modifications of the invention can be made with departing from its spirit and scope as defined by the appended claims.

The embodiments in which an exclusive property or privilege is claimed are defined as follows:

1. A hydraulic suspension strut for a motor vehicle having sprung and unsprung telescopically related hydraulic shock absorber components, said sprung shock absorber component being constructed to be connected to a sprung vehicle structure;

said unsprung shock absorber component being constructed to be connected to a support structure for supporting a steerable road wheel that is adapted to be angularly displaceable about a generally verticle steering axis;

said unsprung shock absorber component being angularly displaceable relative to said sprung shock absorber component about the longitudinal axis of said components to accommodate angular displacement of said road wheel about said steering axis;

a pneumatic spring constructed to be operatively interposed between said sprung vehicle structure and said unsprung shock absorber component whereby a portion of the mass of said sprung vehicle structure is resiliently supported on said unsprung shock absorber component;

said pneumatic spring comprising a flexible annular member that is folded over upon itself to thereby define a rolling lobe portion between its ends;

said flexible annular member being generally concentrically arranged with respect to said shock absorber components and having one of its ends nonrotatably fixed relative to said sprung shock absorber component;

elongated annular means surrounding said unsprung shock absorber component;

bearing means rotatably securing the upper end of said annular means to said unsprung shock absorber components;

said flexible annular member having its other end secured to said elongated annular means with said rolling lobe portion being supported on said elongated annular means;

said bearing means being constructed to transfer the load of said portion of the mass of said sprung vehicle structure from said pneumatic spring to said unsprung shock absorber component;

said bearing means being further constructed to prevent the imposing of a torsional load on said flexible annular member in the event said unsprung shock absorber component is angularly displaced relative to said sprung shock absorber component.

2. A suspension strut with sprung and unsprung portions characterized by:

said strut including a cylindrical housing secured to said unsprung portion and a piston rod secured to said sprung portion and slidably extending from one end of said housing;

a pneumatic spring operatively positioned between said sprung and unsprung portions, said pneumatic spring formed in part by an annular flexible diaphragm having a first annular end portion secured to said sprung portion and a second annular end portion secured to said unsprung portion to form a variable volume chamber; and means for rotatably connecting said pneumatic spring to said strut housing to permit free rotation of said strut housing with respect to said pneumatic spring, said means including:

(i) an annular bearing assembly about said piston rod; and (ii) a diaphragm seat assembly abutting said bearing assembly constructed for relative axial movement with respect to said piston rod and rotational movement with respect to said housing, said diaphragm seat assembly having a sleeve portion coaxially extending about said housing, with said second annular end portion of said flexible diaphragm being secured to said sleeve portion.

3. A suspension strut as defined in claim 2 further characterized by a bearing means positioned between a side wall of said housing and an internal side wall of said sleeve portion to provide rotative movement between said diaphragm seat assembly and said housing.

4. A suspension strut as defined in claim 2 wherein:

said sleeve portion has a contoured outer surface which guides said flexible diaphragm as said variable volume chamber changes volume.

5. A suspension strut as defined in claim 4 wherein said sleeve portion further comprises a radially outward extending flange secured to said sleeve portion and forming a wall of said variable volume chamber with said second annular end portion of said flexible diaphragm sealingly secured to said flange.

6. A suspension strut as defined in claim 5 wherein said radially outward extending flange has an outer axially extending surface to which said second annular end portion of said flexible diaphragm is sealingly secured and on which said flexible diaphragm flexurally rolls as said variable volume chamber changes volume.

* * * * *